Jan. 2, 1968
G. J. HANNES
3,361,610
METHOD OF FORMING SHAPED LAMINATES
Original Filed May 2, 1960
2 Sheets-Sheet 1
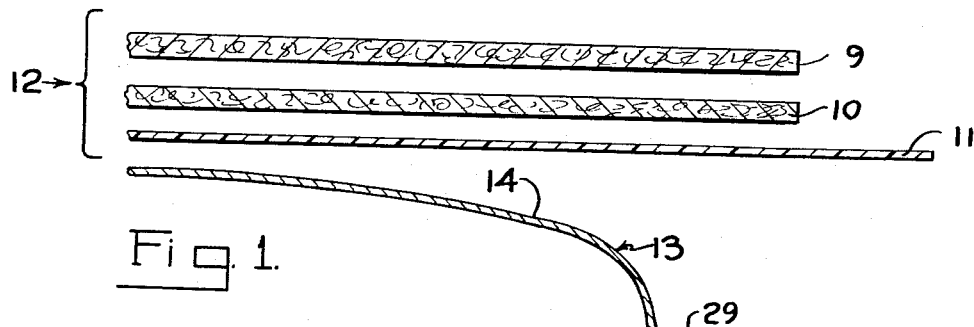
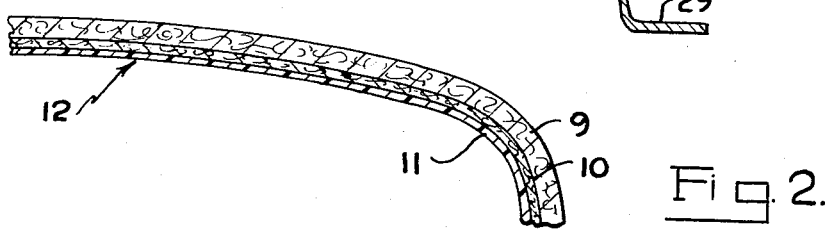
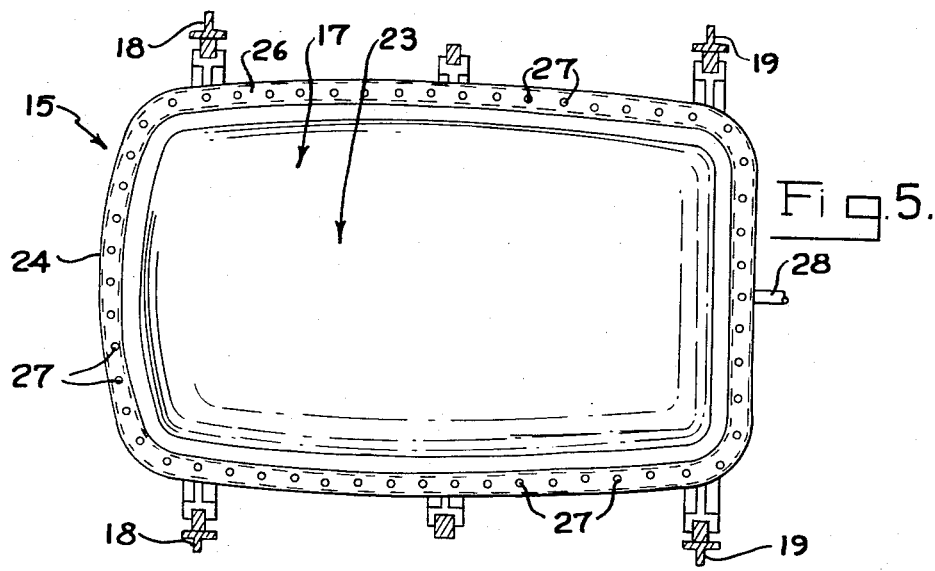
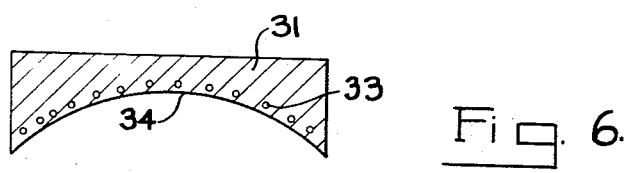
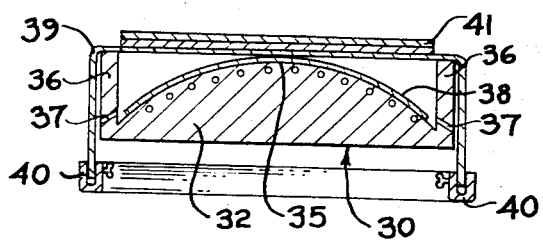
INVENTOR.
GEORGE J. HANNES
BY
*John A. McKinney*
ATTORNEY

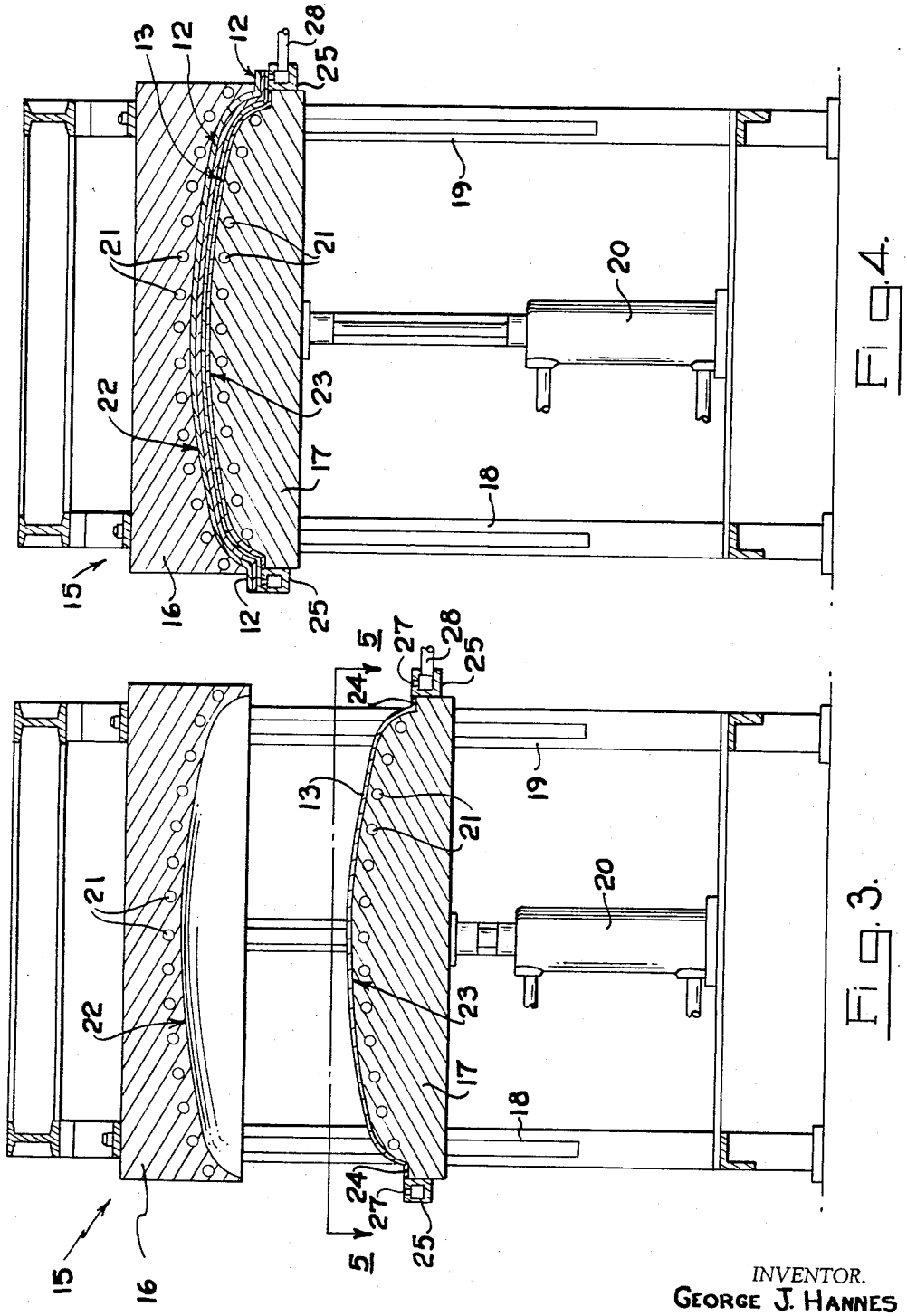

United States Patent Office 3,361,610
Patented Jan. 2, 1968

3,361,610
METHOD OF FORMING SHAPED LAMINATES
George J. Hannes, Maumee, Ohio, assignor to Johns-Manville Corporation, New York, N.Y., a corporation of New York
Continuation of application Ser. No. 26,209, May 2, 1960.
This application Oct. 20, 1965, Ser. No. 506,422
11 Claims. (Cl. 156—219)

This application is a continuation of my application Ser. No. 26,209, filed May 2, 1960, now abandoned, which in turn is a continuation-in-part of Ser. No. 749,165, filed July 17, 1958, now abandoned.

The present invention relates generally to fiber laminates, and more particularly to an improved process for forming a laminate comprising a bonded body of fibers having a sheet of thermoplastic material adhered thereto.

Shaped bonded fiber structures having a thermoplastic covering layer such as one of the vinyl resins are increasingly being used for structures such as automobile headliners, crash pads, trim panels for vehicles, etc. Usually the thermoplastic sheet is provided with an embossed decorative design. One manner of forming such structures has been to glue or otherwise secure an embossed sheet of polyvinyl resin to a mat of glass fibers bonded one to another by a cured thermosetting resin. Thermosetting resins are preferably used for the mat because of the relatively low cost and also because the mat need not be cooled after being heated to activate the resin binder. This, however, is not an entirely economical process since the mat of glass fibers must first be formed in the usual fashion and the fibers bonded one to another to provide a body of the desired shape. In an entirely separate operation the embossed layer of vinyl resin is then secured to the body of fibers.

It has been proposed to apply the embossed vinyl sheet to the mat or layer of resin impregnated fibers prior to the curing of the resin and thus cure the mat and bond the vinyl sheet thereto in a single operation which, of course, would be less costly. The difficulty with this method is that the temperature used to cure the resin must be maintained at a relatively low value, usually less than 150° F., which is insufficient to soften the embossed vinyl sheet, otherwise the embossed design would be destroyed. The necessity of maintaining the curing temperature of the resin binder at such a low value increases the cost of the operation since considerably more time is required than is the case when the usual resin curing temperatures of 250° to 350° F. can be maintained.

The foregoing difficulties may be solved by manufacturing the laminate in accordance with the method disclosed in my application, Ser. No. 749,140, filed July 17, 1958, now abandoned. As there disclosed, a layer of glass fiber containing uncured thermosetting resin is assembled in contact with a thermoplastic sheet having a plain surface. The laminate thus formed is then subjected to heat and pressure between a pair of complementary molding members, one of which has the surface thereof engraved with a suitable pattern which is embossed on the thermoplastic sheet when softened by the heat required to cure the thermosetting resin.

Although entirely satisfactory for producing the desired articles in an economical fashion, this method has one drawback in that the cost of engraving the mold members is quite substantial. Furthermore, when it is desired to change the surface design of the thermoplastic sheet it is necessary to either rework the surface of the engraved mold member or else have additional molding members maving different contours in stock.

It is, therefore, an important object of the present invention to provide an efficient and economical method of forming a laminate comprising a layer of bonded fibers having an embossed thermoplastic sheet secured to a surface thereof.

Another object of the invention is to provide a one-step operation of forming such a laminate in which the binder for the fibers is cured while at the same time the thermoplastic sheet is embossed and secured to the layer of fibers.

The foregoing and other objects and advantages of the invention will become apparent in the course of the following description.

In the drawings, wherein like numerals are employed to designate like parts throughout the same:

FIG. 1 illustrates a sandwich structure showing the various layers which go to form a unitary laminate positioned with reference to a texturing or embossing member for imparting the desired design to the thermoplastic sheet;

FIG. 2 illustrates a fragmentary section of one type of laminate formed in accordance with the invention;

FIG. 3 diagrammatically illustrates the molding apparatus used to carry out the method of this invention in open position;

FIG. 4 diagrammatically illustrates the molding apparatus in a closed position and shows a glass fiber resin impregnated laminate structure being cured under heat and pressure;

FIG. 5 is a sectional plan view taken along the line 5—5 of FIG. 3; and

FIG. 6 is a sectional elevation view of a modified type of molding apparatus.

The method of the present invention comprises placing in contact with one another one or more fibrous layers containing an uncured thermosetting binder and a continuous layer or sheet of thermoplastic material preferably of the vinyl type. Against the surface of the vinyl layer opposite that contacted by the fibrous mat an embossing member or textured surface is placed which has the surface thereof provided with the desired configuration to be imparted to the thermoplastic sheet.

The assemblage of fibrous layer, or layers, thermoplastic sheet and embossing or texturing member is then simultaneously subjected to pressure and heat sufficient to cure the thermosetting resin. Generally, a temperature of between about 290° F. to 370° F. and for a time interval of two to three minutes is sufficient. At these temperatures the thermoplastic sheet readily softens, and due to the pressure has the surface contour or configuration of the embossing member imparted thereto. The pressure applied will depend upon the degree to which the fibrous mat is to be compressed and will vary to this extent. After the resin is cured the heat and pressure is discontinued and the embossing member separated from the laminate which is then ready for use.

With reference now to the drawings there is shown in FIG. 1 a pair of glass fiber mats 9 and 10 and a thermoplastic sheet 11 which go to make up a sandwich structure or laminate 12 which is to be positioned in contact with a textured or embossing member 13 which has the surface 14 thereof, which is to be contacted by the laminate, engraved with a desired design to be imparted to the thermoplastic sheet. The member 13 may be a fabric woven to a desired design, a metal plate having an engraved surface, or any type of member having other than a smooth surface which does not lose its surface configuration at a temperature above the softening temperature of the thermoplastic sheet and preferably at a temperature up to about 400° F.

The glass fiber mats 9 and 10 each may have an uncured thermosetting resin applied thereto or the mat 10, which is to be contacted by the thermoplastic sheet 11, may be impregnated with an uncured thermosetting resin while the mat 9 has the fibers thereof bonded one to another by a cured resin. Prior to assembling the fiber mats and the thermoplastic sheet in contact one with another a film or coating of a heat curable adhesive is preferably applied to the surface of the sheet 11 facing the mat 10 so as to better bond the sheet to the mat. A vinyl or acrylic emulsion type adhesive is suitable for this purpose. This is not necessary, however, if the resin is applied to the fibrous mat in an amount sufficient to bind the mat to the thermoplastic sheet.

It will be understood, of course, that only one layer of fibers containing unactivated thermosetting resin need be used for the laminate 12. In general, however, it is desirable in order to obtain adequate thickness of the laminate to employ a plurality of mats having an uncured resin contained therein, or one layer having a cured resin and thus dimensionally stable in thickness and one or more layers having an uncured resin contained therein which, during the curing process, are compressed to a materially greater density than the layer having the cured resin thus providing a structurally stronger skin having a hard surface to which the thermoplastic sheet is bonded.

The laminate formed in accordance with the procedure previously set forth is placed in contact with the textured member 13 and the assemblage thus formed is then subjected to heat and pressure for a time sufficient simultaneously to cure the resin binder, bond the laminate layers one to another, and soften the thermoplastic sheet so that the surface design of the textured member 13 is embossed on sheet 11. Various means may be used to apply the heat and pressure; for example, the sandwich may be placed between metal plates and then passed through a roller type furnace. If a method of this type is employed sufficient weight should be added to the upper sheet so as to produce a pressure calculated to give the desired density of the layer of fibers having the uncured resin applied thereto.

A platen type press 15 shown in FIGS. 3 to 5 may be used when it is desired to form curved structures. The press 15 comprises an upper platen 16 and a lower platen 17, the upper platen being fixedly secured to vertical support members 18 and 19 and the lower platen 17 being slidably mounted on said supporting members. Vertical movement of the lower platen 17 toward and away from the upper platen is adjustably controlled by a hydraulic cylinder 20. Electrical heating elements 21, which are thermostatically controlled, are positioned within the upper and lower platens directly beneath the molding surfaces 22 and 23 respectively thereof to supply heat to each of the platens.

The marginal portion of the upper surface of the lower platen 17 is provided with an outwardly extending flat ledge 24 which has its periphery terminating at a continuous hollow chamber 25, having its upper surface 26, which is at a level slightly above the ledge 24, provided with a plurality of spaced openings 27 positioned around the periphery of the surface 26 and, by the chamber 25, connected by means of a conduit 28 to a source of vacuum (not shown).

With a platen apparatus of this type a rigid curved textured or embossing member 13 of the type shown in FIG. 1 may be used. The member 13 has sufficient rigidity to support the laminate and is formed of a heat conducting material, such as aluminum, and is contoured to the configuration of the surface 23 of the platen 17. The upper surface 12 of the member 13 has a suitable design engraved therein and around the periphery there is provided a flat marginal lip portion 29 which conforms to the ledge 24 of the surface 23. When positioned on the surface 23, the periphery of the member 13, when formed of a solid metal sheet, is spaced inwardly from the openings 27 so that vacuum may be applied to the undersurface of the sheet 11.

In forming a laminate such as shown in FIG. 2 with the apparatus illustrated in FIGS. 3, 4, and 5, and in accordance with the method of the invention, the lower platen 17 is initially heated to a temperature between 200° F. and 400° F. while the upper platen 16 is initially heated to a temperature between 300° F. and 500° F. The heat conductive embossing plate 13 is then placed upon the upper surface 23 of the lower platen and the sandwich structure or laminate 12 is then placed in the mold upon the embossing plate with the sheet 11 over the openings 27. Alternatively, the laminate 12 may be assembled upon the member 13 and the assemblage thus formed placed upon the platen 17. Also, if desired, the platens may be heated after the laminate is in position. In any event, it is desirable to heat the lower platen to a temperature lower than that to which the upper platen is heated so as to heat the thermoplastic sheet to a lower temperature than the fibrous mat so that an extended cooling period of the sheet after laminating may be avoided. When relatively thin thermoplastic sheets are used differential heating is not important since thin sheets cool very rapidly and may be readily freed from the embossing member substantially immediately after the assemblage is removed from between the platens.

When the laminate is positioned in the mold, the peripheral margin of the thermoplastic sheet 11, which has a greater area than the member 13, will overlie the lip 29 of the member 13 and rest upon the upper surface 26 of the evacuating chamber 25. A vacuum is then applied to the chamber 25 and acts through the openings 27 to tightly retain the margins of the thermoplastic sheet 11 in position relative to the embossing member 13 and cause atmospheric pressure to press the sheet into intimate contact with the member 13. The lower platen is then raised to compress the laminate between the upper and lower platens under a pressure of approximately 100 pounds per square inch.

A curing cycle of approximately two minutes at an average upper and lower platen temperature of between 290° F. to 350° F. and preferably about 300° F. is ordinarily preferred to bond the laminate completely throughout. At the end of the curing cycle, the lower platen 17 is lowered and the textured or embossing member 13 and the cured laminate supported thereon are then removed as a unit from the molding apparatus and preferably allowed to cool before the laminate is stripped from the embossing member. The amount of time necessary for the laminate to cool in contact with the member 13 will depend on the thickness of the thermoplastic sheet 11. For thin sheets in the order of 6 to 12 mils the laminate 12 need not be removed on the member 13, but may be lifted vertically therefrom thus preventing sliding contact which could mar the surface of the still hot thermoplastic sheet. For thicker sheets the time increases in proportion to the thickness, but in general about one minute is sufficient. By removing the laminate while supported upon the member 13, greater production rates may be obtained since it is not necessary to either cool the platens or the assemblage until the thermoplastic sheet has cooled below its softening point.

It was previously brought out that molding members having engraved surfaces could be used in forming a laminate having an embossed surface. The present method is an improvement over the use of engraved molding members in that the surface design of the laminate may be changed by simply using an embossing or texturing member having a different surface contour. Also, when relatively thick thermoplastic sheets are used a cured laminate may immediately be removed upon its embossing member and cooled while a second laminate and embossing member are positioned between the platens, thus providing for increased production rates.

When each of the fibrous mats 9 and 10 contain an uncured thermosetting resin, the resin during the heating and pressing step flows to a certain extent between the mats and also into contact with the thermoplastic layer or sheet 11 thus providing a firm bond between the several layers forming the laminate. Also, as previously pointed out, an adhesive may be used between layers 10 and 11 to bond the thermoplastic sheet to the adjacent fibrous layer.

To provide a laminate having a dense, hard skin to which the thermoplastic sheet is secured and a relatively soft body portion, layer 10 should contain an uncured resin binder, layer 9 should have the fibers thereof bonded one to another, and a small amount of additional binder is preferably added to the interfaces of layers 9, 10 and 11. While such a laminate is being cured, the mat 10 is compressed to a relatively thin layer having a density four or five times that of mat 9. Also, the resin contained in the mat 10, during the heating thereof, bonds the fibers of said layer one to another so that the layer takes on the curvature of the upper and lower platens. Due to the compression and heating of the mat 10, a certain portion of the resin contained therein flows to the interfaces between mat 10 and mat 9 and sheet 11 and forms, upon curing, a firm bond between the three layers or plies of the laminate. The upper mat 9, the fibers of which were originally bonded together by the cured thermosetting resin, resumes its original thickness upon removal from the mold while the more rigid mat 10, having the fibers thereof bonded one to another while the layer is curved, is cured to the contour of the platen and because of its rigidity holds the layer 9 in the same curved shape. Laminates of such construction are desirable in many instances because of the rigidity provided by the layer 10.

In FIG. 6 there is shown apparatus 30 for carrying out a modified form of the method of the invention. The apparatus 30 comprises upper and lower platens 31 and 32 which are supported by a structure (not shown) identical to that used for supporting and activating the platen press 15 shown in FIGS. 3 and 4. The platens 31 and 32 may be heated similarly to the platens 16 and 17 by means of electrical heating elements 33, and each has its molding surface 34 and 35, respectively, curved to the desired curvature to be imparted to the laminate. The apparatus 30 differs from the press 15 in that the surface 35 of the lower platen terminates at the periphery thereof in an encircling, upstanding wall 36 provided along its base with a series of openings 37 to which a vacuum may be applied by suitable means (not shown).

The textured or embossing member utilized with the modified method of the invention is preferably flexible and formed of a material which is inert at temperatures up to about 400° F. Fabrics formed of mineral fibers are satisfactory for this purpose, and very satisfactory textured members have been formed of glass fibers woven into a cloth having the desired decorative pattern to be imparted to the surface of the thermoplastic sheet 11. Preferably, the weave or construction of the textured member is such as to provide a foraminous sheet which is air pervious so that, as will be later explained, vacuum may be applied to all portions of the under surface of the thermoplastic sheet thus causing the same to more intimately contact the textured member.

In carrying out the modified method of the invention, a textured or embossing member 38, formed of a layer of air pervious, flexible woven glass cloth, is placed on the upper surface 35 of the lower platen 32 and is of such an area as to cover substantially completely the surface 35. A thermoplastic sheet 39 having an area greater than that enclosed by the wall 36 is stretched over the wall and placed in tension by means of a ring 40 which is clamped to the periphery thereof. One or more layers or mats of glass fibers 41 having an inactivated thermosetting binder are then placed upon the upper surface of the thermoplastic sheet after which a vacuum is applied to the openings 37 to evacuate the area above the mold surface 35 and beneath the sheet 39 which causes the atmosphere to press evenly upon all portions of the laminate formed by the glass fiber layers and the thermoplastic sheet whereby the laminate is drawn or pressed downwardly. Since the member 38 is foraminous the thermoplastic sheet 39 is drawn into intimate contact therewith due to the fact that the vacuum is applied to substantially the entire area of the undersurface of the sheet 39.

After the laminate has been drawn into contact with the lower platen 32, the platen is raised upwardly as was the case with the mechanism of FIGS. 3 and 4 and the laminate is cured at a temperature between about 250° F. to 350° F. and for between about two to four minutes. Preferably, the cure temperature is about 300° F. and for a time interval of about three minutes. The lower platen is then moved downwardly and the assemblage comprising the laminate and the textured member is then lifted from the lower platen and cooled for a short time interval prior to stripping the textured member from the surface of the thermoplastic sheet. Usually one or two minutes at room temperature is sufficient for the thermoplastic sheet to cool to the extent that the surface pattern is not marred when the textured sheet is stripped therefrom. In general, it is only necessary to allow the thermoplastic sheet to cool below the temperature at which the pattern could be marred by removing the embossing member. Usually, cooling the sheet to a temperature less than about 140° F. is satisfactory.

If desired, an alternate procedure may be used in which the laminate is stripped from the textured member immediately after the platens have opened. In this case the textured member 38 is secured to the upper surface 35 of the lower platen by a suitable adhesive and forms a semi-permanent member upon which a number of laminates may be formed. When removing the laminate from a textured member so secured, care must be taken that the laminate is removed substantially vertically so that the surface pattern of the sheet is not marred. This is necessary since the textured member will be quite hot due to heat conducted therethrough by the lower platen, and thus relative lateral movement between the two while in contact with one another would mar the surface confiuration of the thermoplastic sheet.

The modified process of the invention utilizing the flexible textured member is more advantageous than the use of the substantially rigid member 13 shown in FIG. 1 in that a metal member of this type must have the surface thereof engraved to produce a suitable embossing of the thermoplastic sheet. This is not the case when using a fabric woven to a decorative pattern. Also, a change of curvatures is much less expensively accomplished with a flexible textured member since such member would readily conform to differently curved platens. Furthermore, a better positive contact of the thermoplastic sheet with the textured member is provided since the region beneath substantially the entire undersurface of the thermoplastic sheet may be evacuated.

It has been found that glass fiber mats composed of glass fiber having a diameter in the order of 2 to 6 or 7 microns and an average diameter of approximately 3 or 4 microns produce satisfactory mats for forming laminate structures produced in accordance with the method of the invention. Mats of this type may be formed in accordance with the teachings of U.S. Patent No. 2,489,242 and preferably the thermosetting resin is applied in the form of a spray as the fibers are collected into mat form. The thickness of the uncured mat may vary and is preferably between about ½ to 1 inch depending upon the type of shaped laminate to be formed. The resin content of the mat may be varied between about 7% to 30% by weight of the mat. Generally, a resin content of about 20% is desirable. Any of the normally used thermosetting resins, such as phenol formaldehyde and melamine formaldehyde condensation products may be used. If the laminate is formed using one or more initially unbonded mats, a satisfactory density for the fibers in the cured laminate is on the order of about 2 to 6 pounds per cubic foot and may run as high as 10 pounds per cubic foot. If the laminate is formed using a mat of fibers bonded one to another and a second mat of fibers containing an unactivated resin, a satisfactory density for the bonded mat may run from between about ¾ to 3 pounds per cubic foot, and the density of the initially uncured mat, after laminating and depending upon the amount of pressure used, may vary from about 3 pounds per cubic foot up to about 20 pounds or more per cubic foot.

As previously pointed out, the amount of pressure to be applied during laminating will vary depending upon the type of structures to be produced. In general, it has been found that pressures in the order of about 100 pounds per square inch are satisfactory for producing either a laminate in which a layer or layers of unbonded fibers are employed or when a layer of bonded and a layer of unbonded fibers are used. The pressures may range from about 5 to 150 pounds per square inch since it is desired that a relatively compact fibrous structure is to be formed having high structural strength so that the laminate is capable of spanning up to 10 feet or more without the necessity of employing intermediate supports.

Shaped structures produced in accordance with the method of the present invention have been found to be well suited for use as headliners or trim panels in automobiles, wall structures and various other like uses. The fibrous layer provides a firm, compact and yet semi-resilient backing for the decorative thermoplastic layer which, because of its proven wear resistance, provides a very suitable exterior surface.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method of forming a decorative laminate panel, comprising forming an assemblage comprising a body of low density glass fiber of at least one layer of a mat impregnated with about 7 to about 30% by weight of uncured thermosetting resin, a thermoplastic sheet having a surface in contact with the glass fiber mat containing uncured thermosetting resin, and a texture member in contact with the opposite surface of the thermoplastic sheet, simultaneously applying to the assemblage pressure between a pair of complementary molding platens and heat to a temperature above the softening point of the thermoplastic sheet and sufficient to cure the thermosetting resin binder, thereby substantially simultaneously compressing the low density glass fiber body and thermally curing the uncured thermosetting resin binder of the compressed glass fiber mat bonding the fiber of the mat and the mat to the thermoplastic sheet, and commensurate therewith the said applied heat softening the thermoplastic sheet and the said applied pressure embossing the thermally softened thermoplastic sheet with the pattern of the textured surface, cooling the embossed thermoplastic sheet below its softening point to set the embossed pattern, and removing the textured member from the said thermoplastic sheet.

2. The method of forming a decorative laminate panel as defined in claim 1, wherein an adhesive is applied to the inner face between the thermoplastic sheet and the glass fiber mat.

3. The method of forming a decorative laminate panel as defined in claim 1, wherein pressure is discontinued during cooling.

4. The method of forming a decorative laminate panel as defined in claim 3, wherein the thermoplastic sheet and textured member are retained in contact with one another until the thermoplastic sheet is cooled below its thermal softening point.

5. The method of forming a decorative laminate panel as defined in claim 4, wherein the textured member is substantially rigid, the pressure and heat are simultaneously applied to the assemblage while the assemblage is located between a pair of complementary pressure applying members, and the compressed assemblage is removed from between the members as a unit and then cooled to below the thermal softening point of the thermoplastic sheet.

6. The method of forming a decorative laminate panel as defined in claim 1, wherein the assemblage is simultaneously compressed and heated by locating the assemblage between opposed surfaces of a pair of platens, each of which is at a temperature above the softening point of the thermoplastic sheet.

7. The method of forming a decorative laminate panel as defined in claim 6, wherein the assemblage receiving surface on one platen is curved, the textured member is flexible and initially placed in contact with said curved surface of the platen, and prior to applying pressure to the assemblage, the thermoplastic sheet is pressed against the textured member.

8. A method of forming a decorative laminate panel, comprising forming an assemblage including a body of low density glass fiber of at least one layer of a mat impregnated with about 7 to about 30% by weight of an uncured thermosetting resin, a thermoplastic sheet having a surface in contact with the glass fiber mat containing uncured thermosetting resin, and a textured surface in contact with the opposite surface of the thermoplastic sheet, simultaneously compressing said assemblage between a pair of complementary molding platens and applying heat to the assemblage sufficient to raise the temperature of the assemblage to a point higher than the softening point of the thermoplastic sheet, thereby substantially simultaneously compressing the low density glass fiber body while thermally curing the uncured thermosetting resin binder of the compressed glass fiber mat bonding the fiber of the mat and bonding the assemblage together, commensurate with the said applied heat softening the thermoplastic sheet and with the said applied pressure embossing the thermally softened thermoplastic sheet to the configuration of the textured member, and cooling the embossed thermoplastic sheet of the assemblage below its softening point to set the embossed pattern and removing the textured sheet from the said thermoplastic sheet, the said heating step carried out simultaneously with compression of the assemblage consisting of applying a higher temperature to the compressed glass fiber mat than is applied to the thermoplastic sheet.

9. The method of forming a decorative laminate panel as defined in claim 8, wherein the pressure and heat is applied to the assemblage by a pair of complementary platens between which said assemblage is located, and the platen adjacent to the glass fiber mat is heated to a temperature of approximately 300 to approximately 500° F. and the temperature of the platen adjacent to the textured surface and thermoplastic sheet is heated to a temperature of approximately 200 to approximately 400° F.

10. The method of forming a decorative fibrous laminate panel, comprising forming an assemblage including a low density glass fiber mat of approximately ¾ to approximately 3 pounds per cubic foot containing about 7 to about 30% by weight of an uncured thermosetting resin, a thermoplastic sheet and a flexible textured member, simultaneously applying pressure between a pair of complementary molding platens and heat to the assemblage to a temperature above the softening point of the thermoplastic sheet and sufficient to cure the thermosetting resin binder, thereby substantially simultaneously compressing the low density glass fiber mat to a density of approximately 3 to approximately 20 pounds per cubic foot while thermally curing the uncured thermosetting resin binder of the compressed glass fiber mat, bonding the fiber of the mat and bonding the assemblage, commensurately therewith the said applied heat softening the thermoplastic sheet and with the said applied pressure embossing the thermally softened thermoplastic sheet to the configuration of the textured member and cooling the embossed thermoplastic sheet below its softening point to set the embossed pattern, and thereafter removing the said textured member from the thermoplastic sheet.

11. The method of forming a decorative fibrous laminate panel as defined in claim 10, wherein the temperatures applied to the glass fiber mat are approximately 300 to approximately 500° F. and the temperatures applied to the textured member thermoplastic sheet are approximately 200 to approximately 400° F.

References Cited
UNITED STATES PATENTS

| | | |
|---|---|---|
| 2,442,422 | 6/1948 | Loetscher. |
| 2,606,855 | 8/1952 | Jenkins _____ 156—219 |
| 2,797,179 | 6/1957 | Reynolds et al. _____ 156—219 |
| 2,881,110 | 4/1959 | Walker et al. _____ 156—219 |
| 3,054,714 | 9/1962 | Johnston _____ 156—219 |
| 2,815,309 | 12/1957 | De Ganahl et al. |
| 2,478,267 | 8/1949 | Hickler. |

EARL M. BERGERT, *Primary Examiner.*

ALEXANDER WYMAN, *Examiner.*

W. J. VANBALEN, D. SCHWARTZ,
*Assistant Examiners.*